US007185369B2

United States Patent
Thoone et al.

(10) Patent No.: US 7,185,369 B2
(45) Date of Patent: Feb. 27, 2007

(54) MOTOR VEHICLE NAVIGATION SYSTEM HAVING A PROTECTED STORAGE MEDIUM

(75) Inventors: Martin Thoone, Asslar (DE); Theo Drijfhout, Braunfels (DE)

(73) Assignee: Mannesmann VDO AG (DE)

( * ) Notice: Subject to any disclaimer, the term of this patent is extended or adjusted under 35 U.S.C. 154(b) by 944 days.

(21) Appl. No.: 09/823,876

(22) Filed: Mar. 30, 2001

(65) Prior Publication Data
US 2002/0069360 A1    Jun. 6, 2002

(30) Foreign Application Priority Data
Mar. 30, 2000    (EP) .................................. 00106810

(51) Int. Cl.
*G06F 7/09*    (2006.01)
(52) U.S. Cl. ........................................ 726/30; 380/239
(58) Field of Classification Search ........ 713/182–183, 713/201, 193; 340/388–996; 380/201, 239, 380/213; 726/27–30, 17–21; 705/52
See application file for complete search history.

(56) References Cited
U.S. PATENT DOCUMENTS

| | | | | |
|---|---|---|---|---|
| 4,575,621 A | * | 3/1986 | Dreifus ...................... | 235/380 |
| 4,891,760 A | * | 1/1990 | Kashiwazaki et al. ...... | 701/200 |
| 5,416,840 A | * | 5/1995 | Cane et al. .................. | 705/52 |
| 5,563,947 A | | 10/1996 | Kikinis ......................... | 380/4 |
| 5,598,470 A | * | 1/1997 | Cooper et al. .............. | 713/165 |
| 5,677,953 A | | 10/1997 | Dolphin ........................ | 380/4 |
| 5,689,252 A | * | 11/1997 | Ayanoglu et al. ........... | 340/991 |
| 5,787,170 A | | 7/1998 | OpdeBeek .................... | 380/4 |
| 5,887,269 A | * | 3/1999 | Brunts et al. ............... | 701/208 |

(Continued)

FOREIGN PATENT DOCUMENTS
WO    97/44736    * 11/1997

(Continued)

OTHER PUBLICATIONS

Deitel (H.M. Deitel, "Operating Systems", 2nd edition, 1990, ISBN: 0201180383).*
Jumes et al. (Jumes, Cooper, Chamoun and Feinman, "Microsoft Technical Reference, Microsoft Windows NT 4.0 Security, Audit and Control", 1999).*

(Continued)

*Primary Examiner*—Gilberto Barron, Jr.
*Assistant Examiner*—Peter Poltorak

(57) ABSTRACT

The invention specifies a navigation or multimedia system in which a check is carried out to determine whether a user of files, such as roadmap data, is authorized to use these files. To this end, the navigation system has means for checking authorized use of files on the bulk storage medium on which the files are stored. The files are stored in encrypted form, in particular. In accordance with an inventive method for enabling the use rights on a file, provision is made for the user to enter a first and a second scrambled code (PIN and ACW) into the navigation system first. These codes are converted into vectors. A device identifier ID of the navigation system and the first scrambled code PIN are first used to calculate a key k. The key k and the second scrambled code ACW are used to calculate an access authorization identifier AC, which is compared with the access authorization identifiers for the files stored on the storage medium. If these identifiers match, the associated file is decrypted and enabled for use by the navigation system.

27 Claims, 5 Drawing Sheets

U.S. PATENT DOCUMENTS

| | | | | |
|---|---|---|---|---|
| 6,069,588 A * | 5/2000 | O'Neill, Jr. | ................. | 343/713 |
| 6,161,071 A * | 12/2000 | Shuman et al. | ............... | 701/48 |
| 6,538,623 B1 * | 3/2003 | Parnian et al. | ................ | 345/8 |
| 2001/0011237 A1 * | 8/2001 | Tanaka et al. | ................ | 705/27 |
| 2002/0002466 A1 * | 1/2002 | Kambayashi et al. | .......... | 705/1 |
| 2003/0159042 A1 * | 8/2003 | Steinberg | ................... | 713/172 |

FOREIGN PATENT DOCUMENTS

| | | |
|---|---|---|
| WO | WO 97/44736 | 11/1997 |
| WO | WO 98/42098 | 9/1998 |

OTHER PUBLICATIONS

Keller (Robert M. Keller, "Complexity", http://www.cs.hmc.edu/claremont/keller/webBook/ch11/,1997).*

Hadfield et al. (Lee Hadfield, Dave Hater, Dave Bixler, "Windows NT Server 4 Security Handbook", 1997, ISBN: 078971213), p. 85, 166 and 168.*

Dietel (H.M. Deitel, "Operating Systems", 2nd edition, 1990, ISBN: 0201180383), p. 390-391, 400-401.*

Jumes et al. (Jumes, Cooper, Chamoun and Feinman, "Microsoft Technical Reference, Microsoft Windowws NT 4.0 Security, Audit and Control", ISBN: 1574231818X, 1999, p. 149 and 151.*

* cited by examiner

MOTOR VEHICLE NAVIGATION SYSTEM HAVING A PROTECTED STORAGE MEDIUM

BACKGROUND OF THE INVENTION

1. Field of the Invention

The Present invention relates to a motor vehicle computer system in the form of a navigation or multimedia system, having a central processor with associated memory elements, and also an input unit, an output unit and a reader for a bulk storage medium, which are each connected to the central processor. The invention also relates to a storage medium for such a motor vehicle computer system and to a method for enabling a file stored on a storage medium.

2. Description of the Related Art

Motor vehicle navigation systems as such have been known for a relatively long time and are increasingly offered in new vehicles or for retrofitting purposes. In this context, the maps required for route calculation are stored on a storage medium together with other files, such as travel guides or hotel guides. The storage medium generally provided for this purpose is a CD-ROM, which stores the appropriate files.

The navigation system contains an associated reader for reading the files. A storage medium such as a CD-ROM or also, in particular, a DVD has a high storage capacity, so that a large amount of data, possibly in compressed form, can be stored. Such a storage medium can therefore have a high selling value. Using suitable devices, such as a so-called "CD burner", it is a relatively simple matter to make copies of a CD-ROM. Copied CD-ROMs are sometimes swapped free of charge among interested parties or are sold illegally. There is therefore a need to enable appropriate programs or, more generally, files only for registered users.

Since a single CD-ROM or DVD can hold a number of programs or files, for example the roadmap data for Europe, it is also important to enable only individual files or a particular number of files, such as the roadmap data for a country, for a particular user. Ideally, such enabling should again be associated with an appropriate level of copy protection, so that, once the file has been enabled, it can also be used only by the registered and authorized user.

It is therefore one object of the present invention to specify a motor vehicle computer system which allows only an authorized user to use particular roadmap data or programs.

Another object of the invention is to specify a protected storage medium for navigation or multimedia systems. A third object is to specify a method for enabling a file, stored on a storage medium together with at least one other file, for use by a motor vehicle computer system. Other objects and advantages of the present invention will be apparent in light of the following Summary and Detailed Description of the present invention.

SUMMARY THE INVENTION

The first-mentioned object is achieved in a motor vehicle computer system of the generic type by virtue of the fact that the navigation or multimedia system also has means for checking authorized use of files on the bulk storage medium in the navigation or multimedia system. This allows a respective check to be carried out to determine whether the user of the data is an authorized user. If he is not an authorized user, he cannot access the files on the storage medium. This means that, although a CD-ROM or DVD containing the files can be copied in whatever manner and distributed, the data can be read only in an authorized system.

Multimedia systems for motor vehicles differ from pure navigation systems in that they perform a number of functions. These may sometimes include a navigation function, an audio function with the components radio receiver, CD player or cassette player, TV functions, an Internet function or a telematic function. In the multimedia system, individual components such as the output unit are used for various functions. These may include, by way of example, the visual output of routing instructions, playback of TV pictures and display of Internet pages on a visual output unit. The illustrations below will essentially by geared to a navigation system for reasons of clarity, but a multimedia system may also perform the same or similar functions in all cases.

One development of the invention provides, in particular, for the bulk storage medium to hold encrypted files. The data can be used only in an authorized navigation system containing the appropriate means for decrypting the encrypted files. This measure ensures that the files are protected overall.

To enable individual files for a particular user, each of the files can now be encrypted using a different key. The authorized user can then access a particular file only if he knows the respective key, whereas he cannot access other files whose key is not known to him. This practice requires a large number of keys to be allocated for the various files, however.

One preferred embodiment therefore provides that, in order to enable individual files, there is a file management system which is designed to compare an access authorization identifier entered using the input unit with access authorization identifiers for the files stored on the bulk storage medium. This practice requires only one key to encrypt all files. Each of the files has a dedicated access authorization identifier, however, which the authorized user needs to enter once into the motor vehicle navigation system in order to enable the appropriate file. The file management system compares the entered identifier with the identifier associated with the file, the latter identifier also being stored on the storage medium. Only if the two identifiers match is the appropriate file enabled for use by the navigation system.

Such a navigation system already provides a certain level of protection against unauthorized use of the files. However, the identifier may be passed on, possibly together with the key for decrypting the files, to an unauthorized user by an authorized user, so that the unauthorized user can also access the files.

Another refinement therefore provides that the navigation system contains means for unscrambling an access authorization identifier entered in scrambled form. Scrambled entry of the identifier ensures that an unauthorized user whose navigation system does not contain the appropriate means for unscrambling the access authorization identifier cannot use the files.

It has been found to be particularly advantageous if the access authorization identifier can be described as a vector. This specific type of identifier means that it is a simple matter to link said identifier to the structure of the file directory on the storage medium and to process it using mathematical operations. To this end, the invention provides, in particular, that an at least m-dimensional vector is involved, where m is the number of files stored on the bulk storage medium. In this context, files are understood as being not only programs, databases and the like, but also, in particular, file directories, which themselves may again contain file directories and/or files.

If the storage medium thus has a file structure containing m files, including the file directories, then, in particular, each vector for a file has m components, which are denoted by a(1), a(2), a(3), . . . a(m), for example. In this case, each of these components a(x) denotes a file or a file directory. If the path for a particular file D(x) in the hierarchical file structure is routed, by way of example, via the file directories a(2), a(5), a(9), then these components are characterized by the value 1, while all other components of the vector take the value 0. Such a vector is allocated to a particular file by the file management program stored in the navigation system.

In another refinement, the navigation system has a device identifier ID which is stored in a nonvolatile memory element. If this device identifier ID is included in the check for use authorization, protection is increased further. This is because an unauthorized user then also needs to know an authorized user's device identifier in order to be able to use the files on the storage medium. Protection against unauthorized use of the files is increased again by virtue of the fact that the device identifier can be changed. This prevents an unauthorized user who has once gained knowledge of an authorized user's device identifier from continuing to be able to use another file of the authorized user for his own use each time one has been enabled.

The invention provides, in particular, that the navigation system has means for calculating a key k for decrypting the encrypted files from a first code PIN, entered in scrambled form, and the stored device identifier ID. The invention also provides that the navigation system has means for calculating an access authorization identifier AC from a second code ACW, entered in scrambled form, using the key k. An authorized user for a particular file, such as the roadmap data for a particular country, receives the first code PIN and the second code ACW, which are both scrambled, from a central station or from the dealer after appropriate payment.

As an alternative to this, the invention provides that the navigation system is connected to a communication means which permits communication with a central station in which the use rights on the files are managed. This allows the user to enable required files directly and at any time. The communication means may, in particular, be a radio telephone. The radio telephone can be connected to the navigation system by means of a line, or the navigation system and communication means can be connected wirelessly using a short-haul radio link, for example on the basis of the inherently known Bluetooth method. In addition, traffic information taken into account for route planning may also enter the navigation system via a radio link by means of radio telephone.

A method according to the invention for enabling a file which is stored on a storage medium together with at least one other file and is provided with an access authorization identifier AC for use by a computer system, in particular a motor vehicle navigation system or motor vehicle multimedia system, by evaluating a first and a second scrambled code (PIN and ACW) is characterized in that a device identifier ID for the computer system, which is stored in the computer system, and the first scrambled code PIN are used to calculate a key k, and the key k and the second scrambled code ACW are used to determine the identifier AC for the file which is to be enabled, and also the file provided with the calculated identifier AC is enabled for use by the computer system. In addition, the file which is to be enabled is preferably encrypted.

Thus, although the storage medium, for example a CD-ROM or DVD, on which the files are stored and distributed can still be copied, the files can initially be used only if the appropriate key for decrypting the files is known. To prevent the appropriate key also being passed on to an unauthorized user by an authorized user, the invention provides that the key, for its part, is also transmitted only in scrambled form to the authorized user. The scrambled code containing the key also contains the device identifier for the authorized navigation system. This ensures that, if the scrambled code containing the key is passed on, this code cannot be used on another navigation system having a different device identification number.

To enable only particular files for use, a second code is provided, which contains details about the file which is to be enabled. This second code also first needs to be unscrambled in the navigation system initially, and this is likewise possible only with the correct device identification number for the navigation system. Unscrambling the code in an unauthorized navigation system results, on account of the latter's different device identification number, in a different unscrambling result, and hence in an incorrect identifier for the file which is to be enabled. To increase the protection of the method further, the invention also provides that the device identification number is changed by the central station whenever a file is enabled. The codes PIN and ACW and also the device identifier ID, the key k and the access authorization identifier AC are preferably described as vectors.

One particular embodiment also provides a change vector c which is linked to the vector for the device identifier ID whenever a file is newly enabled, so that a new vector is generated for the device identifier.

An inventive storage medium suitable for use in the navigation system described has a plurality of files which are stored in encrypted form in a hierarchical file structure and, according to the invention, have an associated identifier, which can be described as a vector, in order to ensure exclusively authorized access. In particular, this vector is an m-dimensional vector, where m is the number of files. Preferably, the vector has binary components.

The inventive navigation system and the inventive method are explained in more detail below with the aid of an illustrative embodiment and the drawing, in which:

BRIEF DESCRIPTION OF THE DRAWINGS

FIG. 4: illustrates different variants of the access authorization identifier.

DETAILED DESCRIPTION OF THE PRESENTLY PREFERRED EMBODIMENTS

Figure 1:
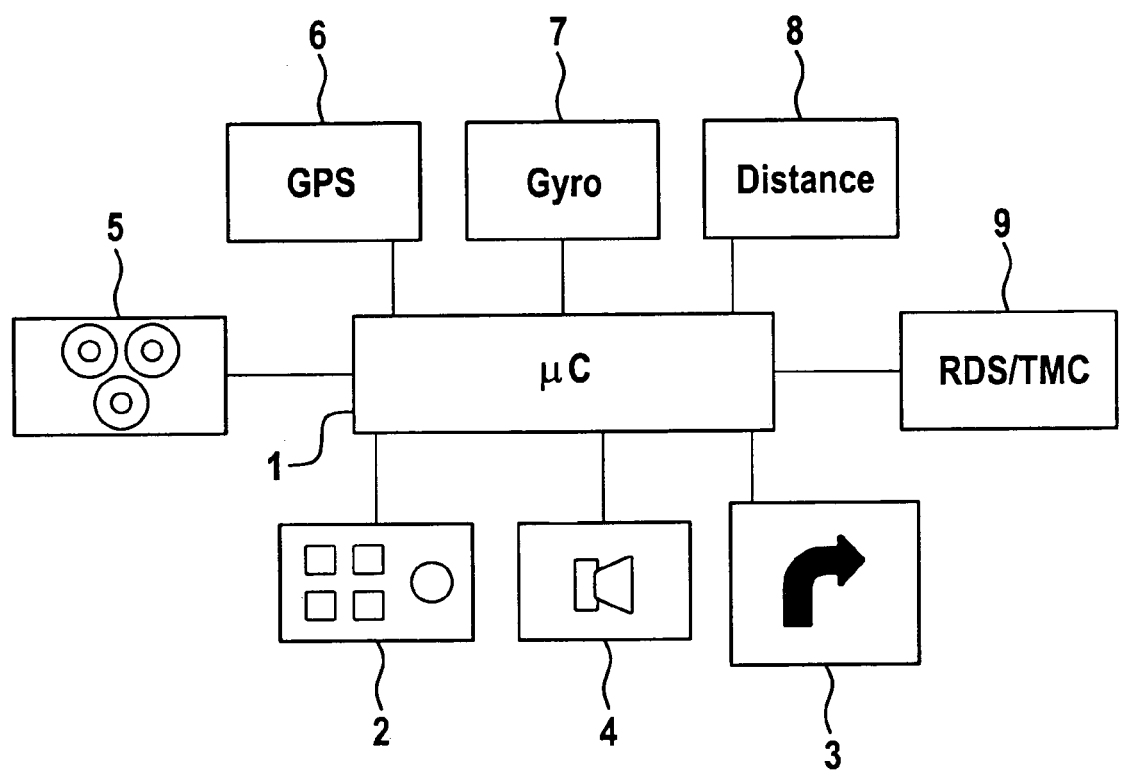
FIG. 1: illustrates the components of a navigation system.

FIG. 1 illustrates the components of a navigation system. The central component part of the navigation system is the processor 1, which forms, with its main memory and a nonvolatile read-only memory, the navigation computer. Connected to the central processor 1 is a manual input unit 2 which can be used to enter a destination and also the scrambled codes PIN and ACW. As an alternative or in addition to a manual input unit, a voice input unit may be provided. The navigation system also has a visual output unit 3 (optional) and an audio output unit 4, which can each be used to output routing information. In addition, the navigation system has a reader 5 connected to the central processor 1. The reader 5 is designed for reading files from a CD-ROM and/or a DVD.

For the purpose of position finding, the navigation system also has a GPS receiver 6 used to receive appropriate satellite signals and to forward them to the central processor 1 for the purpose of position finding. In order to be able to find a position independently of satellites, the navigation system also has a direction sensor 7 and a distance sensor 8. To be able to perform dynamic navigation with the inclusion of traffic messages, the navigation system is also connected to a radio receiver 9 designed to receive RDS/TMC messages. The navigation system may also be connected to a radio telephone (not shown).

Figure 2:
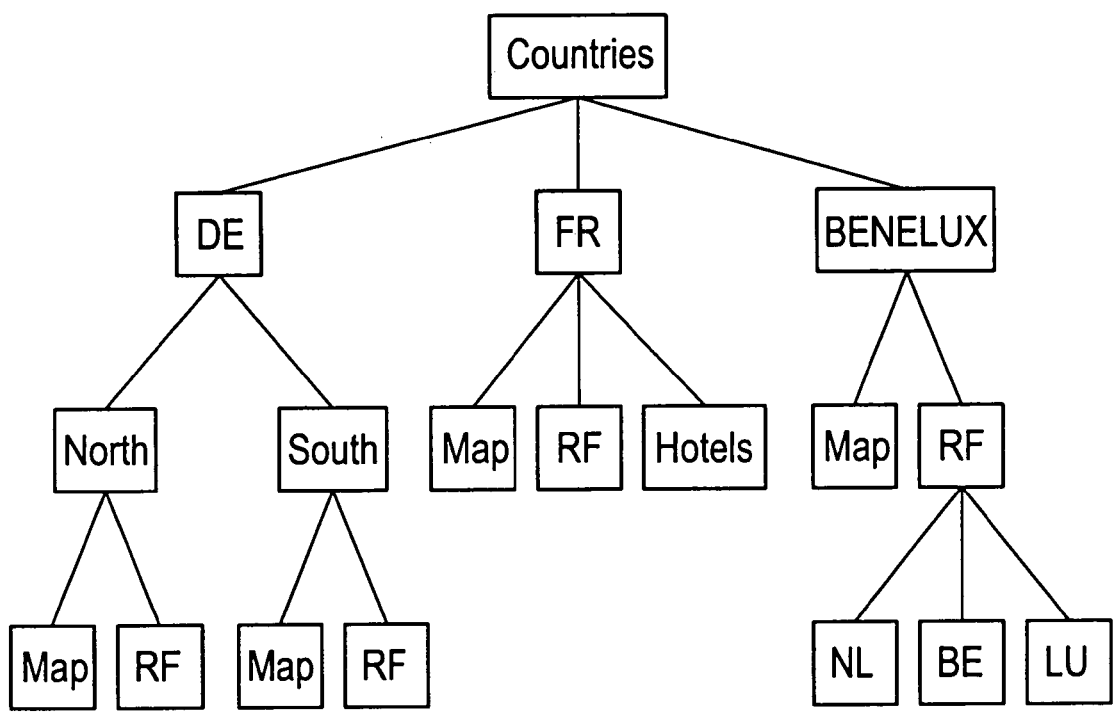
FIG. 2: illustrates the file directory on a CD-ROM for a navigation system.

FIG. 2 shows, by way of example, the hierarchical file structure of a CD-ROM containing roadmap data and other files. In this instance, the file directory "Countries" is shown. In addition, there may be other file directories, containing specific programs, for example, such as a program for assigning the numbers of highway junctions to geographical data. The file directory "Countries" contains the subordinate file directories "DE" for Germany, "FR" for France and "BENELUX" for the Benelux countries. The file directory "DE" is split further into a file directory "North" and a file directory "South", which each contain the files for the corresponding geographical areas of Germany.

The file directory "North" contains, in the form of files, a database containing roadmap data and another database containing a travel guide (RF). Corresponding files are also present in the file directory "South". The file directory "FR" directly contains the corresponding files for France without any further geographical split having been made. In this case, a file containing roadmap data, a travel guide and a hotel guide are involved. The file directory "BENELUX" contains both a file which contains the roadmap data for this area and a file directory (RF), which contains the travel guides for the three countries the Netherlands (NL), Belgium (BE) and Luxembourg (LU).

Figure 3:
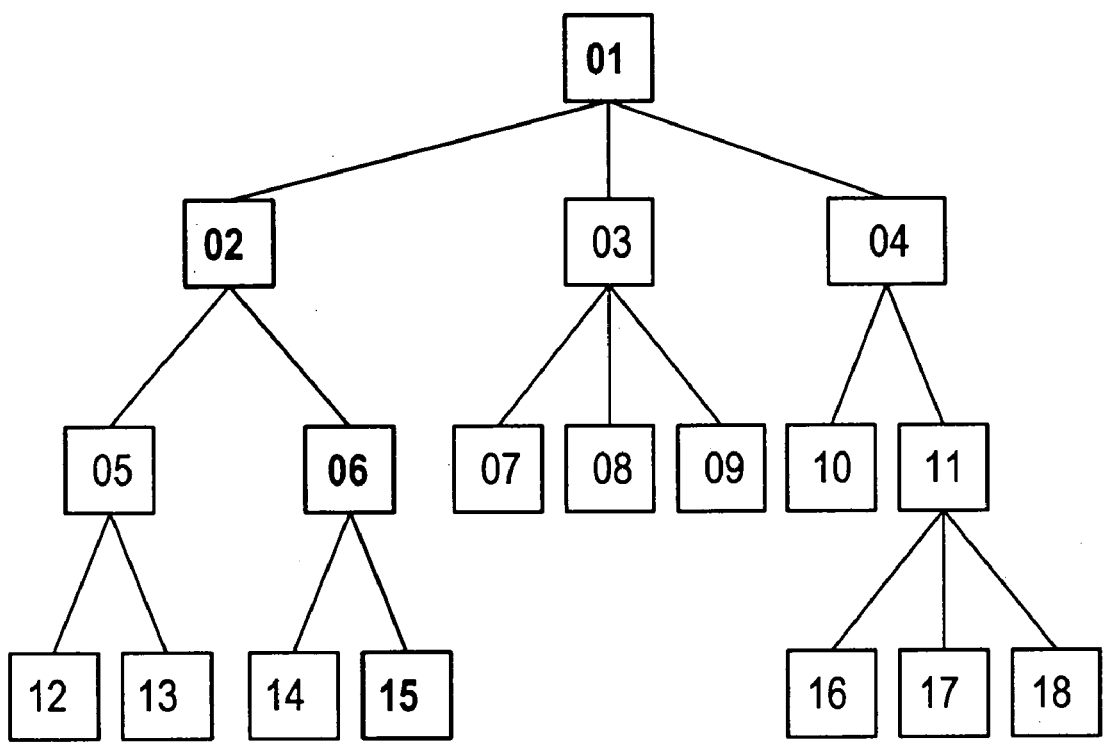
FIG. 3: illustrates a hierarchical file directory in general form.

FIG. 3 illustrates the file structure corresponding to FIG. 2 in generalized form, with the files now being numbered. As already mentioned, the files may be file directories, databases or application programs. Each of the files shown in FIG. 3 has an associated access authorization identifier which can be described as a vector having 18 components. The number of components corresponds to the sum total of files and file directories. In this case, the file directory D01 is characterized by the first component of the vector, the file directory D02 is characterized by the second component and, generally, the file m is characterized by the component m of the vector. The entire vector for the identifier of a file is now composed from the path leading to this file. This is described using the example of file D15 and is shown in the bottom area in FIG. 3. The path to the file D15 is routed via the files or file directories D01, D02, D06 and D15, so that the corresponding positions 01, 02, 06 and 15 in the associated vector for the file D15 take the value 1, while all other components of the vector take the value 0. To ensure that the access authorization identifier provides adequate protection, it should not comprise too few components. To ensure adequate protection by the access authorization identifier even with a small number of files, said access authorization identifier can be extended, as shown in FIG. 4.

FIG. 4a illustrates an access authorization identifier containing 10 components, this being intended to correspond to the number of files. FIG. 3b shows an extension of this access authorization identifier to 19 components, with random components r being inserted between the components which characterize a file, said random components being eliminated again by the navigation system.

The user of a navigation system can now purchase a CD-ROM containing a number of files and does not first have to obtain any ultimate use rights. By way of example, the buyer of a new car gets a navigation system and a CD-ROM containing the associated databases at the same time as the car. However, since the user has under some circumstances not yet been registered as such, he can still not use his navigation system to access the individual files stored in encrypted form on the CD-ROM. First, the user will load the file management system, which is likewise stored on the CD-ROM, into his computer system. The user must then obtain the use authorization.

To do this, he can, in particular, make a telephone call to a central station. The user tells this central station that he wishes to use a particular file, for example the roadmap data for a particular country, and also communicates his current device identifier, of which he was informed when purchasing the new navigation system, and the necessary data for paying for the use rights. The central station first calculates a new device identifier ID(i) from the previous device identifier ID(i−1) and a change vector c, for example: ID(i)=ID(i−1)*c.

Next, a first scrambled code PIN is calculated, which contains the new device identifier ID(i) and the key k required for encrypting the files on the CD-ROM, for example on the basis of: PIN=inv[ID(i)]*k.

A second scrambled code ACW is then calculated, which contains the key k and also the access authorization identifier AC for the desired file which is to be enabled, for example on the basis of: ACW=k*AC.

The new device identifier ID(i) and also information about the enabled file and the payment details are then stored in the central station. The scrambled codes PIN and ACW are notified to the user. This can be done by telephone or else by post. In these two cases, it is advantageous for the vector for the scrambled codes, which contains binary components, to be first written as a binary number and converted into a decimal number, the decimal number then being conveyed to the user. In this case, the user can enter the simpler and shorter decimal number into his computer system, which then in turn converts it into a binary number or into a vector containing binary components. Accordingly, the user may also convey the device identifier to the central station as a decimal number at the beginning, the central station then converting the decimal device identifier into a vector.

In one alternative exemplary embodiment, in which the navigation system is connected to a radio telephone, an automated procedure may be provided. To this end, the user can retrieve a menu program in the navigation system, said menu program giving him a list of choices relating to the programs and databases stored on the CD-ROM. The user selects one or more of the desired programs and additionally enters the necessary information relating to the payment details, such as his credit card number. The user then activates the transmission request used to invoke the mobile radio link to the central station. This radio link is used to transmit the enable request, the payment data and the current device identifier ID(i−1), which is stored in a nonvolatile memory of the computer, automatically. The scrambled codes are then calculated in the central station as described above.

Figure 5:
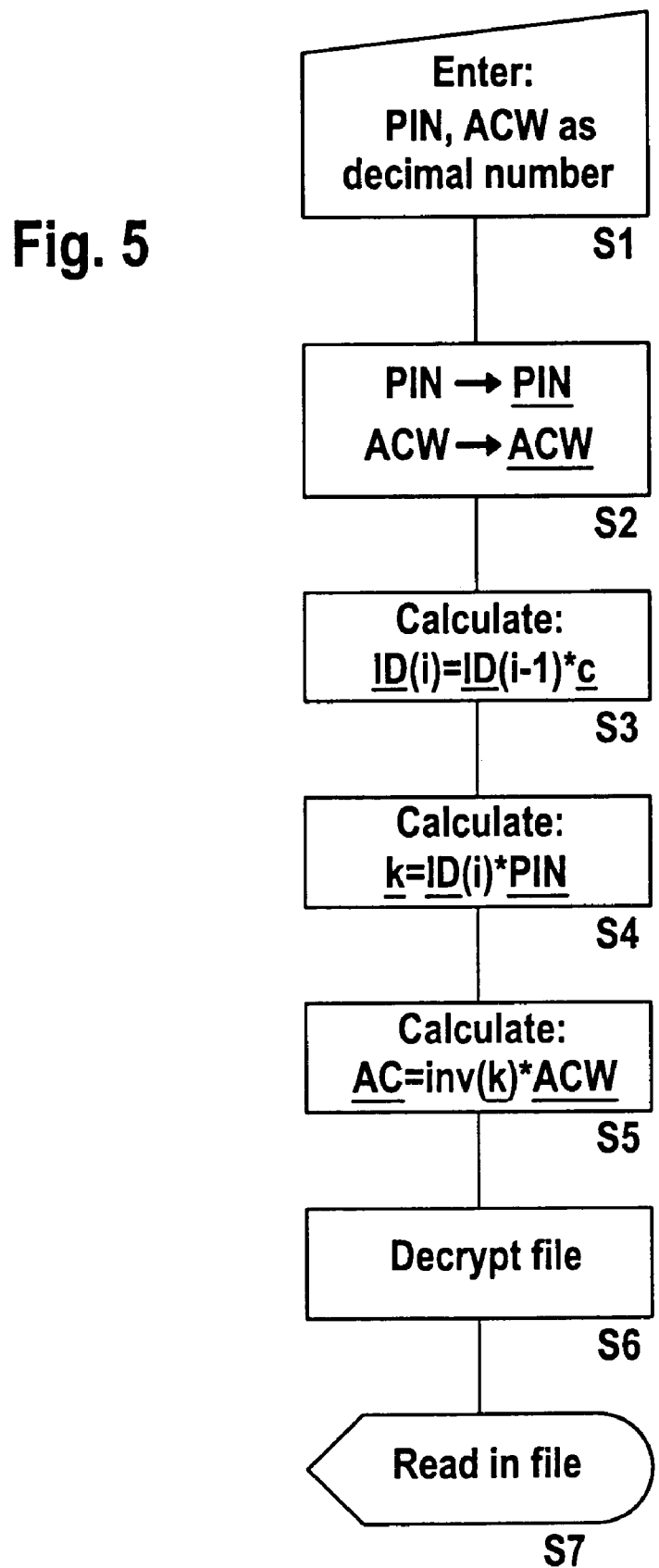
FIG. 5: illustrates a flow chart of the method.

It will be assumed below that the scrambled codes have been conveyed to the user by mouth or in writing. The method which then takes place is illustrated as a flowchart in FIG. 5. In step S1, the user enters the scrambled codes PIN and ACW in the form of decimal numbers into the navigation system using the input keypad. In step 2, the navigation system converts the scrambled codes into vectors containing binary components, the decimal number first being converted into a binary number, and the individual digits of the binary number representing the components of the vector. The navigation system then calculates the new device identifier ID(i) from the previous device identifier and a change vector, which are both stored in a nonvolatile memory element.

In step S4, the new device identifier ID(i) and the first scrambled code PIN are now used to calculate the key k for decrypting the files, specifically on the basis of k=ID(i)*PIN.

Next, the key k or the vector inv(k), which is the inverse of the key vector k, and the second scrambled code ACW are used to calculate the access authorization identifier AC on the basis of: AC=inv(k)*ACW. For symmetrical encryption algorithms, inv(k) is=k.

The navigation system's file management system then enables the file associated with the identifier AC for use, and this file can be decrypted using the key k which is now known, or can be displayed or used for further processing.

The method according to the invention thus couples the enabling of a file to the device identifier, so that the enable codes cannot be used for another system. The change made to the device identifier whenever a use authorization is newly enabled means that protection is increased. The files on the storage medium are also encrypted using the key k, and the key k can be produced from the first scrambled code PIN only if the device identifier is known. The identifier AC, in turn, can be calculated from the second scrambled code only when the key k is known. In this case, encryption can be performed on the basis of one of the known methods, in particular on the basis of the Data Encryption Standard (DES) using a key with a length of 56 bits.

In addition, the method according to the invention can be used to enable files on the basis of a time limit. Such enabling for a limited time is useful, for example, if a user requires map data for a particular regional area only for a limited period of time. By way of example, such an instance may be a one-off foreign holiday in a particular country for a few weeks.

A file can be enabled for a limited period on this basis by virtue of the access authorization identifier containing components which characterize enabling for a limited time. An appropriate access authorization identifier is shown in FIG. 3c, for example. In this example, the first 10 components of the vector AC for the access authorization identifier are linked to the files stored on the CD-ROM, as in the cases described above. In addition, the vector now contains the components t1, t2 and t3, however, which give details of use with a time limit. By way of example, the component t1 can be used to enable the file for a first period of one week, for example, if this component is set to 1. Accordingly, the component t2 can be used to enable the file for a second period of one month, for example, if this component is set to 1. Accordingly, the component t3 can be used to stipulate that the file be enabled for a third period of six months, for example. In this context, the period starts to run only when the file is enabled. The navigation system or the file management program in the navigation system recognizes, in this case, whether one of the components t1 to t3 has been set to one, and sets a corresponding time marker, in which case, whenever new use of the file is planned, a check is carried out to determine whether the set time frame has expired.

In the illustrative embodiment portrayed, it has been assumed that the files are stored on a CD-ROM or the like, and this CD-ROM is supplied to the user. In this case, the navigation system always accesses the files stored on the CD-ROM. However, the files may also be stored on a memory element of the processor, in particular on a hard disk, for example. The files can be transferred to the hard disk from the CD-ROM or, in the case of a multimedia system, also from the Internet, for example, using the mobile radio link.

In addition, the scrambled codes can also be stored on a storage medium with a low storage density, for example on a "smart card", and made accessible to the user. The codes can then be read into the navigation system directly from this storage medium using an appropriate reader.

We Claim:

1. A motor vehicle navigation or multimedia computer system comprising:
    a central processor with associated memory and a manual input unit;
    an output unit and a reader for a bulk storage medium, wherein the navigation or multimedia system has means for checking authorized use of each of the bulk storage medium and a selected file from a group of files on the bulk storage medium;
    a file management system which is designed to compare an access authorization identifier to enable access to the selected file from a group of files, calculated from a code entered using the manual input unit with access authorization identifiers for the files stored on the bulk storage medium;
    a means for unscrambling an access authorization identifier entered in scrambled form;
    means for calculating a key (k) decrypting an encrypted file from a first code (PIN) stored on the storage medium, entered in scrambled form, and a stored device identifier; and
    means for calculating the access authorization identifier (AC) from a second code (ACW), entered in scrambled form using the key (k).

2. The computer system as claimed in claim 1, wherein the bulk storage medium contains encrypted files.

3. The computer system as claimed in claim 1, further comprising means for decrypting encrypted files.

4. The computer system as claimed claim 1, wherein the access authorization identifier can be described as a vector.

5. The computer system as claimed in claim 4, wherein an at least an m-dimensional access authorization identifier is utilized, where m is the number of files stored on the bulk storage medium.

6. The computer system as claimed claim 1, further comprising a device identifier (ID) which is stored in a nonvolatile memory element.

7. The computer system as claimed in claim 6, wherein the device identifier can be changed.

8. The computer system as claimed in claim 6, wherein the device identifier (ID) is a vector.

9. The computer system as claimed in claim 6, wherein the device identifier can be automatically changed whenever a new first code has been entered.

10. The computer system as claimed in claim 1, further comprising voice input means.

11. The computer system as claimed in claim 1 further comprising a reader for an optical bulk storage medium.

12. The computer system as claimed in claim 1, wherein the bulk storage medium is a CD-ROM.

13. The computer system as claimed in claim 1, wherein the bulk storage medium is a DVD.

14. The computer system as claimed in claim 1, wherein the files are roadmap data and/or system programs and/or application programs.

15. The computer system as claimed in claim 1, further comprising a connection to a communication means which permits communication with a central station in which the use rights on the files are managed.

16. The computer system as claimed in claim 15, wherein the connection is a short-haul radio link.

17. The computer system as claimed in claim 15, wherein the communication takes place via a mobile radio network.

18. The computer system as claimed in claim 1, wherein the system is designed to receive and process traffic information.

19. A method for enabling access to a selected group of files which are a subset of files stored on a storage medium comprising the steps of:
  calculating a key (k) with a device identification number (ID), wherein the device identification number (ID) is for the storage medium, and a first scrambled code (PIN) by a motor vehicle computer system;
  generating an identifier (AC) with the key (k) and a second scrambled code (ACW) entered manually for the selected group of files which are to be enabled; and
  enabling access to the selected group of files provided with the generated identifier used by the computer system;
  wherein the storage medium is used by the computer system;
  wherein the selected group of files is encrypted using the key (k) and is decrypted for use by the computer system using the key (k).

20. The method as claimed in claim 19, wherein the selected group of files are enabled by a file management system of the computer system.

21. The method as claimed in claim 20, wherein the device identification number (ID) is changed whenever another file on the storage medium is enabled, and the changed device identification number is stored in a nonvolatile memory of the computer system.

22. The method as claimed in claim 20, wherein the selected group of files are part of a hierarchical file structure on the storage medium.

23. The method as claimed in claim 20, wherein the generated identifier is a vector.

24. The method as claimed in claim 23, wherein the access authorization identifier has binary components.

25. The method as claimed in claim 22 wherein m components $a(1), a(2), a(3), \ldots$ of a vector $AC(x)=(a(1), a(2), a(3), \ldots, a(x-1), a(x), a(x+1), \ldots, a(m))$ are used to determine a position of a file $D(x)$ in the hierarchical file structure such that all the components of the vector $AC(x)$ which are allocated to files on which the file $D(x)$ is hierarchically dependent take a first value, while all the remaining components, which are allocated to files on which the file $D(x)$ is not hierarchically dependent, take a second value.

26. The method as claimed in claim 20, wherein the key (k) is a vector.

27. The method as claimed in claim 20, wherein the device identification number (ID) is a vector.

* * * * *